Feb. 25, 1930.  G. M. BERGSTROM  1,748,629
TROLLEY POLE
Filed May 13, 1929
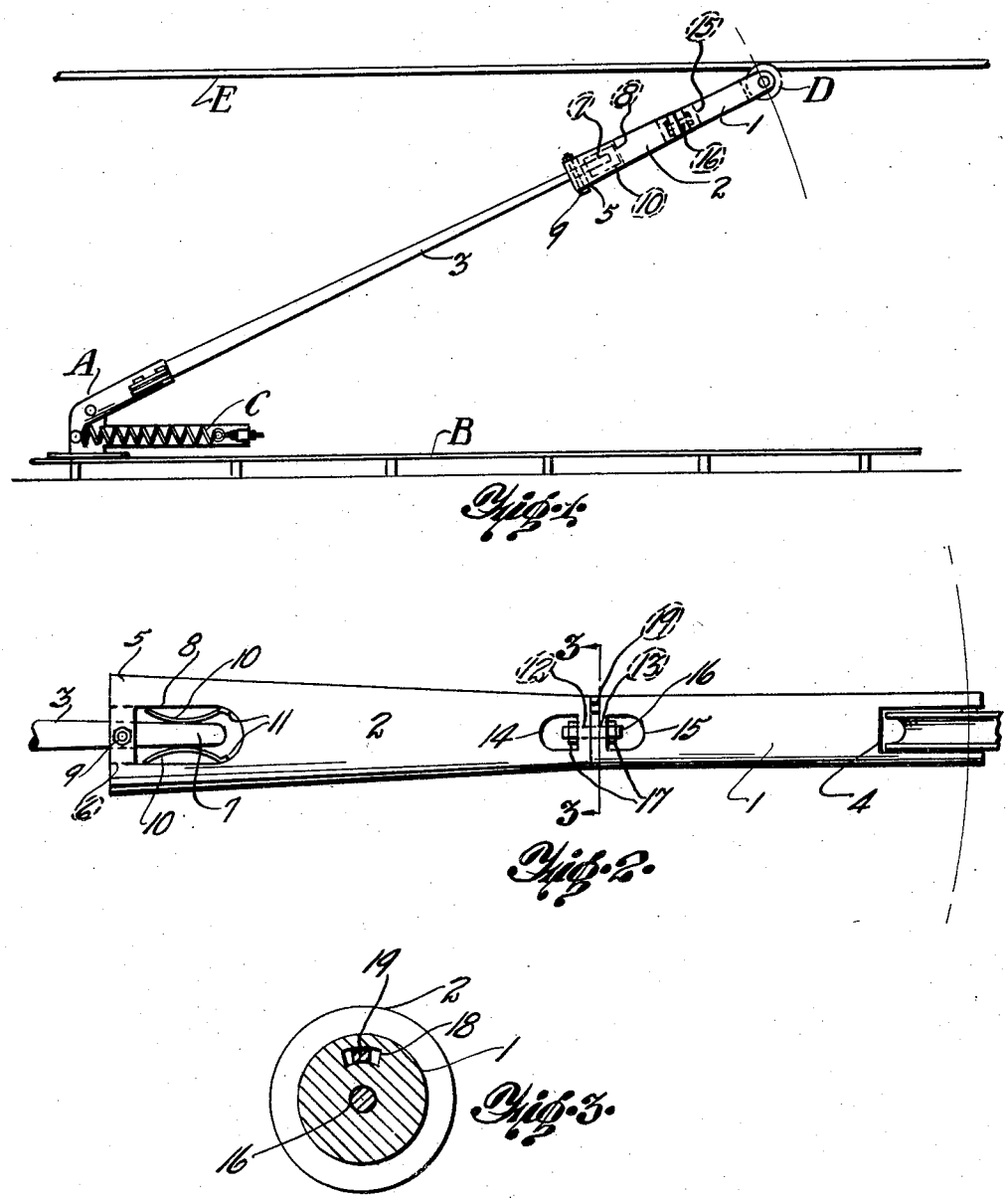
Inventor
Gunnar M. Bergstrom
By Adam E. Fisher
Attorney Patented Feb. 25, 1930

1,748,629

UNITED STATES PATENT OFFICE

GUNNAR M. BERGSTROM, OF McKEESPORT, PENNSYLVANIA

TROLLEY POLE

Application filed May 13, 1929. Serial No. 362,595.

This invention relates to improvements in trolley poles for electric cars and the main object is to provide an improved pole which will not become disengaged from the trolley wire when the car turns a corner, enters or leaves a switch or when the height of the trolley wire above the track varies.

Another object is the provision of a device of this kind which may be used in connection with the conventional trolley pole supporting mechanism.

The foregoing and other objects together with means whereby the same may be carried into effect will best be understood from the following description of a preferred embodiment of the ivention taken in connection with the accompanying drawing wherein:

Figure 1 is a side view of my invention in use.

Figure 2 is an enlarged plan view of my invention.

Figure 3 is an enlarged section along the line 3—3 in Figure 2.

Referring now more particularly to the drawing the reference character A denotes a trolley pole supporting mechanism rotatably mounted upon the roof B of a car and having the springs one of which is shown at C adapted to normally elevate the trolley pole and maintain the current collector or trolley wheel D in engagement with the trolley wire E. The foregoing elements are of conventional form and I make no claim therefor.

In accordance with the invention I provide a trolley wheel housing 1 and a coupling or swivel 2 adapted to be mounted upon the free end of the trolley pole 3 in a manner to be described. The wheel housing 1 is preferably though not necessarily circular in cross section and has at one end the slot 4 in which is rotatably mounted the aforesaid trolley wheel D. The coupling 2 is preferably tapered somewhat as shown and is also circular in cross section. One end 5 of the coupling 2 has a longitudinally extended passageway 6 adapted to loosely receive the end 7 of the trolley pole 3 which end extends into a laterally cut or extended aperture 8 in the coupling, the said aperture being spaced from the end 5 as shown. The trolley pole 3 and coupling 2 are pivotally connected by a bolt 9 which passes through the said coupling and the pole adjacent the passageway 6. Leaf springs 10 are secured by one end at 11 within the aperture 8 upon either side of the end 7 of the pole and engage the said pole to normally hold the coupling in axial alignment therewith. The other ends of the wheel housing 1 and coupling 2 are provided with passageways 12 and 13 which communicate with apertures 14 and 15 similar to the passageway 6 and aperture 8 just described. A bolt 16 passes through the passageways 12 and 13 and nuts 17 are secured upon the ends of this bolt within the apertures 14 and 15 thus connecting the said housing and coupling and permitting the former to rotate. A slot 18 is provided in the end face of the housing 1 and a lug 19 is provided upon the adjacent end face of the coupling 2, the said lug 19 engaging the slot 18 to limit the rotation of the said housing.

In use the trolley wheel D is allowed to freely and easily follow any curve or other variation of the trolley wire E since the coupling 2 and housing 1 may swing laterally with respect to the pole 3 or the said housing 1 may rotate somewhat upon the said coupling. The leaf springs 10 are sufficiently strong to normally maintain the coupling 2 in alignment with the pole 3 yet they allow the trolley wheel to follow the slightest inequality of the trolley wire without turning the supporting mechanism A as will be understood.

While I have herein set forth a certain preferred embodiment of my invention it is understood that I may vary from the same in minor structural details, not departing from the spirit of the invention and within the scope of the appended claims.

I claim:

1. In a device of the character described, a trolley pole, a trolley wheel housing having a slot in its upper end, a trolley wheel mounted in the slot, a coupling having a longitudinally extended passageway and a laterally cut aperture in one end adapted to receive the end of the trolley pole, the said coupling being pivoted on the trolley pole, leaf springs mounted in the said aperture in engagement with the end of the trolley pole, the said wheel housing and coupling having longitudinally extended passageways and laterally cut apertures in their meeting ends, a bolt extended through the passageways into the said apertures, nuts upon the ends of the bolt, the said wheel housing having also a slot in its end face and a lug upon the end of the said coupling adapted to play in the said slot.

2. In a device of the character described, a trolley pole, a trolley wheel housing, a trolley wheel journaled in the housing, a coupling rotatably connected to the said housing, means for limiting the rotation of the said housing relative to the coupling, the said coupling having a passageway to receive the said trolley pole and being pivoted thereon and means for resiliently holding the said coupling in alignment with the trolley pole.

In testimony whereof I affix my signature.

GUNNAR M. BERGSTROM.